United States Patent [19]
Scheil

[11] Patent Number: 5,835,886
[45] Date of Patent: Nov. 10, 1998

[54] METHOD FOR ANALYZING A MEASUREMENT VALUE AND MEASUREMENT VALUE ANALYZER FOR CARRYING OUT THE METHOD

[75] Inventor: Hermann Scheil, Hemhofen, Germany

[73] Assignee: Siemens Aktiengesellschaft, Munich, Germany

[21] Appl. No.: 847,890

[22] Filed: Apr. 28, 1997

Related U.S. Application Data

[63] Continuation of PCT/DE95/01420, Oct. 13, 1995.

[30] Foreign Application Priority Data

Oct. 26, 1994 [DE] Germany ............................ 44 38 300.2

[51] Int. Cl.⁶ ..................................................... G01B 17/00
[52] U.S. Cl. ........................................... 702/179; 702/182
[58] Field of Search ............................... 364/550, 551.01, 364/551.02; 395/902, 904, 906, 911, 912, 914, 915; 702/179–185, 190, 194, 196

[56] References Cited

U.S. PATENT DOCUMENTS

| | | | |
|---|---|---|---|
| 4,642,782 | 2/1987 | Kemper et al. | 364/550 |
| 4,644,479 | 2/1987 | Kemper et al. | 364/550 |
| 4,649,515 | 3/1987 | Thompson et al. | 364/900 |
| 5,089,978 | 2/1992 | Lipner et al. | 364/551.01 |
| 5,127,005 | 6/1992 | Oda et al. | |
| 5,132,920 | 7/1992 | Bellows et al. | 364/551.01 |
| 5,293,323 | 3/1994 | Doskocil et al. | 364/551.01 |
| 5,329,465 | 7/1994 | Arcella et al. | 364/551.01 |

FOREIGN PATENT DOCUMENTS

| | | |
|---|---|---|
| 33 14 181 A1 | 10/1984 | Germany . |
| 34 35 465 A1 | 2/1986 | Germany . |
| 35 38 908 A1 | 5/1987 | Germany . |
| 39 39 630 A1 | 5/1990 | Germany . |
| 39 21 286 A1 | 1/1991 | Germany . |

OTHER PUBLICATIONS

Patent Abstract of Japan No. 4198729 (Takehito), dated Jul. 20,1992.
"Knowledge based fault diagnosis for technical processes" (Isermann), AT/ Automatisierungstechnik, Nov. 1988, No. 11.
"Measurement and Control", vol. 22 No. 5,Jun. 1989, pp. 132–141.
"Power Plant On–Line Diagnostic System for Turbines, Generators and Water Chemistry" (Dr. I. J. King) Advances in Instrumentation, Part 1, 1988, pp. 133–149.

*Primary Examiner*—James P. Trammell
*Attorney, Agent, or Firm*—Herbert L. Lerner; Laurence A. Greenberg

[57] ABSTRACT

A method for analyzing or conditioning a measurement value identified in a system process of a measurement system and a measurement value analyzer for carrying out the method, test the measurement value for plausibility at a first comparison point with reference to characteristic variables specific to the measurement system. In order to achieve a particularly high degree of reliability when monitoring the measurement value for errors, the consistency of the measurement value with measurement parameters identified independently of the measurement value, is tested at a second comparison point with reference to rules characteristic of the system process. A confidence factor for the measurement value is identified in dependence on a result of the testing.

3 Claims, 2 Drawing Sheets

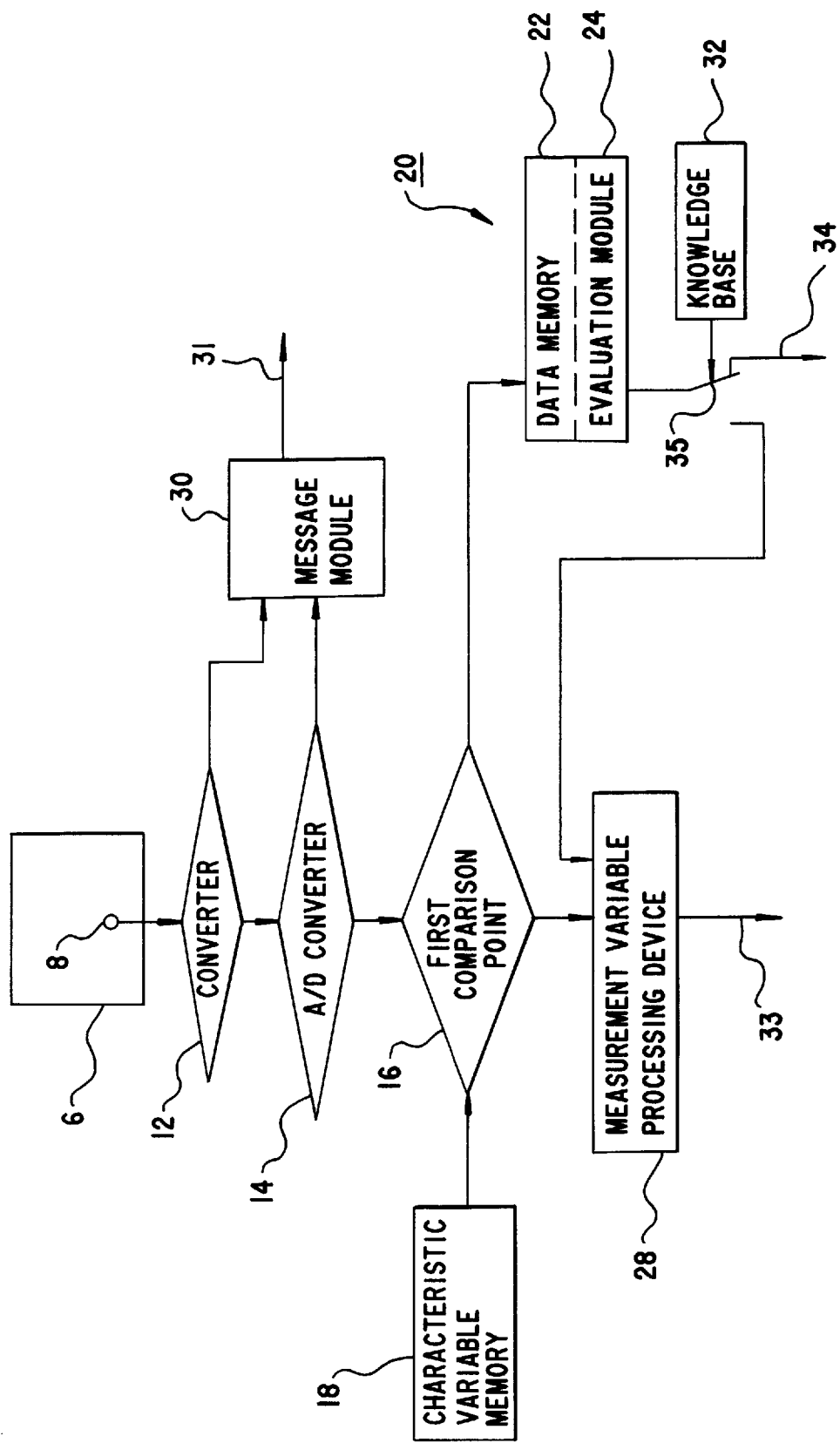

METHOD FOR ANALYZING A MEASUREMENT VALUE AND MEASUREMENT VALUE ANALYZER FOR CARRYING OUT THE METHOD

CRESS-REFERENCE TO RELATED APPLICATION

This application is a continuation of application Ser. No. PCT/DE95/01420, filed Oct. 13, 1995.

BACKGROUND OF THE INVENTION

FIELD OF THE INVENTION

The invention relates to a method for analyzing a measurement value identified in a system process of a measurement system and tested for plausibility at a first comparison point with reference to characteristic variables specific for the measurement system. The invention also relates to a measurement value analyzer for carrying out the method.

In technical systems, in particular in power generating plants, automated control systems and analysis and diagnostic systems for monitoring the system process are being increasingly used. However, the increase in monitoring functions also entails an increase in the demands made of the analysis and diagnostic systems which monitor, for example, a turbo set made up of a turbine and a generator as part of the power plant. In such a case, it is usually assumed that a measurement signal to be evaluated by a measurement value detection and processing device corresponds to the measurement variable or to the physical state of the system process.

The physical state or the measurement variable is usually detected within a measurement system by a sensor and converted along a measurement path into the measurement signal through the use of a converter. The measurement signal which is converted, if appropriate through the use of an analog/digital converter, is tested for plausibility. The plausibility test takes place as a rule at a comparison point with reference to characteristic variables which are specific for the measurement system. The characteristic variables are in turn derived from known variables of the sensor, of the converter, of the analog/digital converter and of the measurement path, such as, for example, temperature range, signal range or measuring range, tolerance range, signal-to-noise ratio and/or ambient influences, and from monitoring of the power supply of the measurement system. However, monitoring methods based on a pure plausibility test do not provide adequate reliability with regard to freedom from error of a detected measurement value for such an assumption based on a correspondence between the measurement signal and the measurement variable. The reason therefor is that on one hand each measurement signal is fundamentally subject to error. On the other hand, a systematic error which is due to ambient influences and/or changes in the measurement system cannot be detected. An example thereof is measurement signal drift which lies within a tolerance range derived from the characteristic variables.

SUMMARY OF THE INVENTION

It is accordingly an object of the invention to provide a method for analyzing or conditioning a measurement value with which errors due to a system can be selected and evaluated and a measurement value analyzer for carrying out the method, which overcome the hereinafore-mentioned disadvantages of the heretofore-known methods and devices of this general type and which are simple.

With the foregoing and other objects in view there is provided, in accordance with the invention, a method for analyzing a measurement value, which comprises testing a measurement value identified in a system process of a measurement system for plausibility at a first comparison point with reference to characteristic variables specific to the measurement system; testing consistency of the measurement value with measurement parameters identified independently of the measurement value at a second comparison point with reference to rules characteristic of the system process; and identifying a confidence factor for the measurement value in dependence on a result of the checking or testing.

The invention herein is based on the consideration that after the plausibility test has taken place it is not possible to draw reliable conclusions with regard to the probability content of the identified measurement value with reference to a pattern of the sensor and of the measurement path, produced from the characteristic variables of the measurement system. Instead, after the first comparison point is passed through, the result of this plausibility test has to be checked again on the basis of further or other criteria which go beyond those of the plausibility test with reference to the measurement system pattern. If this checking takes place with reference to a counter-test with the measurement parameters which reproduce the identified measurement value and which are preferably also analyzed or tested according to this method, it is possible to draw conclusions as to the reliability or probability of error of the measurement value. Due to the fact that the counter-test for consistency of the identified measurement value takes place with such measurement parameters which have been identified independently of the measurement value and from which the state on which the measurement value is based can be derived, conclusive reference information which can be derived independently of the identification of the measurement value is obtained. The result of a comparison of this conclusive reference information, i.e. a corresponding reference value, with the identified measurement value is then the basis for an evaluation or weighting of the measurement value. For this purpose, a process control mechanism with rules which are characteristic of the system process is derived, with reference to suitable algorithms, from the measurement parameters identified independently of the measurement value.

In accordance with another mode of the invention, the identified measurement value is then also input into this control mechanism so that continual updating of the rules takes place.

With the objects of the invention in view there is also provided a measurement value analyzer for analyzing a measurement value identified in a system process of a measurement system, comprising a characteristic variable memory for the measurement system identifying the measurement value; a first comparison module connected to the characteristic variable memory; a data memory at least for measurement parameters identified independently of the measurement value; a second comparison module connected to the first comparison module and to the data memory, for deriving a desired value or a reference value and thus also a weighting factor for the measurement value from the measurement parameters with reference to process-engineering rules characterizing the system process; and an evaluation module connected to the second comparison module for identifying a weighting or confidence factor for the measurement value with reference to expert knowledge. The weighting or confidence factor is subsequently assigned to the measurement value before or during further measurement value processing.

Other features which are considered as characteristic for the invention are set forth in the appended claims.

Although the invention is illustrated and described herein as embodied in a method for analyzing a measurement value and a measurement value analyzer for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a flow diagram for analysis and conditioning of a measurement value.

DESCRIPTION OF THE PREFERRED EMBODIMENTS

Figure 1:
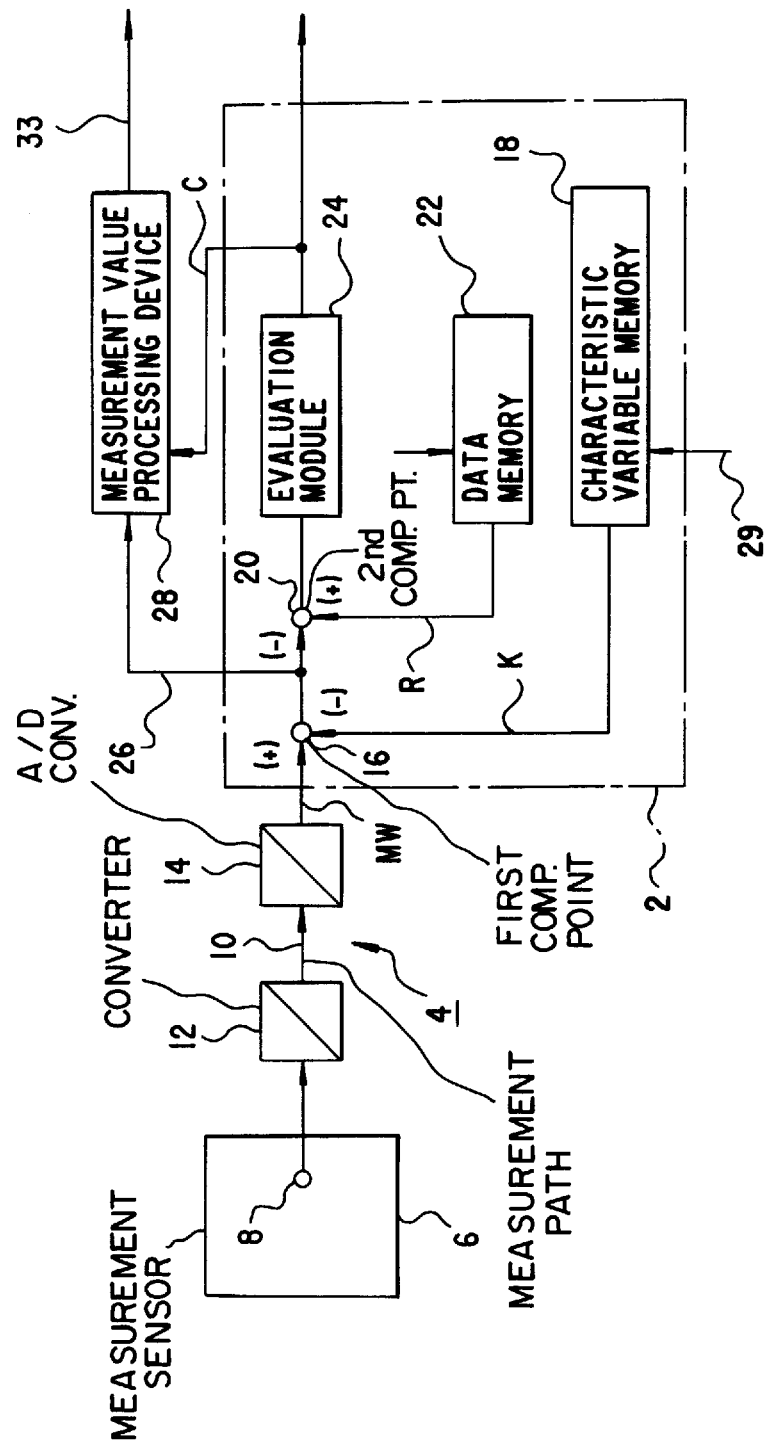
FIG. 1 is a basic schematic and block circuit diagram of a measurement value analyzer.

Referring now in detail to the figures of the drawings, in which components that correspond to one another are provided with the same reference symbols, and first, particularly, to FIG. 1 thereof, there is seen a basic circuit diagram of a measurement value analyzer 2 to which a measurement value MW detected in a schematically indicated system process 6 is fed through a measurement system 4. The measurement system 4 includes a measurement sensor 8 which records a specific physical state of the system process 6, for example a temperature. It also includes a converter 12, along a measurement path 10, for producing a measurement signal, and an analog/digital converter 14. The system process 6 is, for example, a conversion which is realized in a turbo set by process engineering steps, for converting thermal energy into electrical energy.

The measurement value analyzer 2 has a first comparison module or comparison point 16 and a characteristic variable memory 18 connected thereto, for the measurement system 4. The measurement value analyzer 2 also has a second comparison module or comparison point 20, which is connected to the first comparison module 16 as well as to a data memory 22 for measurement parameters identified independently of the measurement value MW and to an evaluation module 24. A branch 26 which is provided between the first comparison module or comparison point 16 and the second comparison module or comparison point 20, leads into a module 28 for processing measurement values.

The measurement value MW, which is output to the measurement value analyzer 2 by the measurement system 4, is tested for plausibility at the first comparison point 16 through the use of characteristic variables K from the characteristic variable memory 18. This plausibility test takes place with reference to known variables of the measurement system 4, i.e., for example, with reference to manufacturer information relating to the sensor 8 and the converter 12 as well as the analog/digital converter 14. The characteristic variables K are identified algorith-mically from this manufacturer information, from character-istic curves derived from basic measurements and from environ-mental influences or conditions, such as air humidity and temperature, and are stored in the character-istic variable memory 18 in the form of a pattern of the measurement system 4. Furthermore, a pattern of the measurement path 10 is produced and also stored in the characteristic variable memory 18. The inputting of these characteristics of the measurement system 4 into the characteristic variable memory 18 is indicated by an arrow 29.

As is illustrated in the flow diagram according to FIG. 2, initially a state test of the measurement value converter 12 and of the analog/digital converter 14 is carried out through the use of the measurement value analyzer 2. In the event that the measurement converter 12 and/or the analog/digital converter 14 fail, a message is issued through the use of a message module 30 and, if appropriate, measurement value sampling is carried out as is indicated by an arrow 31. If the measurement value converter 12 and the analog/digital converter 14 operate properly, the measurement value MW is compared with the pattern derived from the characteristic variables K. With reference to the pattern it is initially detected whether or not the measurement value MW is plausible, i.e. whether it lies, for example, between a pre-scribed upper limit and lower limit. In this case, it is also determined, for example, whether or not the gradient of the measurement value MW is plausible in comparison with a possible change over time in the measured physical state of the system process 6. In other words if, for example, the measurement value MW changes more quickly than the corresponding physical state can change, the measurement value MW or the measurement signal drops out of the pattern and a fault message is issued. A fault message is also issued, for example if, in a so-called life-zero monitoring of the measurement system 4, the measurement value MW drops below a lower limit of the measurement system 4 which is displaced with respect to the actual zero point. In this case as well, the measure-ment value MW is detected as implausible. Otherwise, a measurement value MW which is detected as plausible is fed through the branch 26 to the further measurement value processing device 28 in FIG. 1.

At the same time, the measurement value MW which is plausible with reference to the pattern detection is fed to the second comparison point 20 and compared there with process-engineering rules R which are characteristic for the system process 6. For this purpose, a control mechanism, having rules which are drawn up with reference to expert knowledge from measurement parameters identified inde-pendently of the measurement value MW, is stored in the data memory 22. The consistency of the measurement value MW with measurement parameters identified independently of the measurement value MW from the system process 6 is tested with reference to the rules R which are characteristic for the system process 6.

If, for example, the pattern detection requires that a specific temperature value must lie between 20° C. and 50° C. and if the corresponding measurement value MW indicates, for example, a temperature T of 30° C., this measurement value MW passes through the first comparison point 16. If it is also assumed in this example that the measurement value MW has been measured at a pipe which has hot vapor flowing through it with a vapor pressure p of, for example, 10 bar and a flow rate v of, for example, 3 m/s and a temperature T' of, for example, 50° C. as measurement parameters, derivation or reproduction of the measurement value MW from these measurement parameters p, v, T' is carried out with reference to the rules R according to a prescribed algorithm. A reference value or desired value which is derived from these measurement parameters p, v, T' is compared with the actually detected measurement value MW at the second comparison point 20. If the measurement value MW deviates from this reference value, an evaluation of the measurement value MW takes place in the evaluation module 24. During this process a confidence factor C for weighting the measurement value MW is determined with reference to expert knowledge stored in a knowledge base 32 shown in FIG. 2. The confidence factor C is fed to the module 28 for the processing of measurement values and is fed, together with the measurement value MW, to a diagnostic system, for example, as is indicated by an arrow 33. The measurement value MW is thus fed to the diagnostic system together with information regarding the reliability or the degree of error of the measurement value MW. For example, a confidence factor C of 0.7 indicates that the measurement value MW is 30% incorrect or errored. If the probability of error derived from the confidence factor C lies above an adjustable threshold value, an appropriate message as well as a display of the measurement value MW and of the confidence factor C are produced, as is indicated by an arrow 34. This is symbolized in FIG. 2 through the use of a switch 35.

System errors of the measurement system 4 can also be advantageously detected with this analysis method for conditioning the measurement value MW detected in the system process 6. In particular, even slight drift movements of the detected measurement value MW over a specific measurement period are detected. Thus, as a result of the weighting of the measurement value MW which reflects a degree of error of the measurement value MW, a particularly high degree of reliability during an analysis and diagnosis of the process 6 to be monitored is ensured.

I claim:

1. A method for analyzing a measurement value, which comprises:

testing a measurement value identified in a system process of a measurement system for plausibility at a first comparison point with reference to characteristic variables specific to the measurement system;

deriving a desired value for the measurement value from measurement parameters identified independently of the measurement value with reference to rules characteristic of the system process;

testing consistency of the measurement value with the derived desired value at a second comparison point; and identifying a confidence factor for the measurement value in dependence on a result of the testing.

2. The method according to claim 1, which comprises updating the rules characteristic of the system process by the measurement value.

3. A measurement value analyzer for analyzing a measurement value identified in a system process of a measurement system, comprising:

a characteristic variable memory for a measurement system having a system process identifying a measurement value;

a first comparison module connected to said characteristic variable memory;

a data memory for measurement parameters identified independently of the measurement value;

a second comparison module connected to said first comparison module and to said data memory, for deriving a desired value for the measurement value from the measurement parameters by rules characterizing the system process; and an evaluation module connected to said second comparison module for identifying a confidence factor for the measurement value.

\* \* \* \* \*